Figure 1:
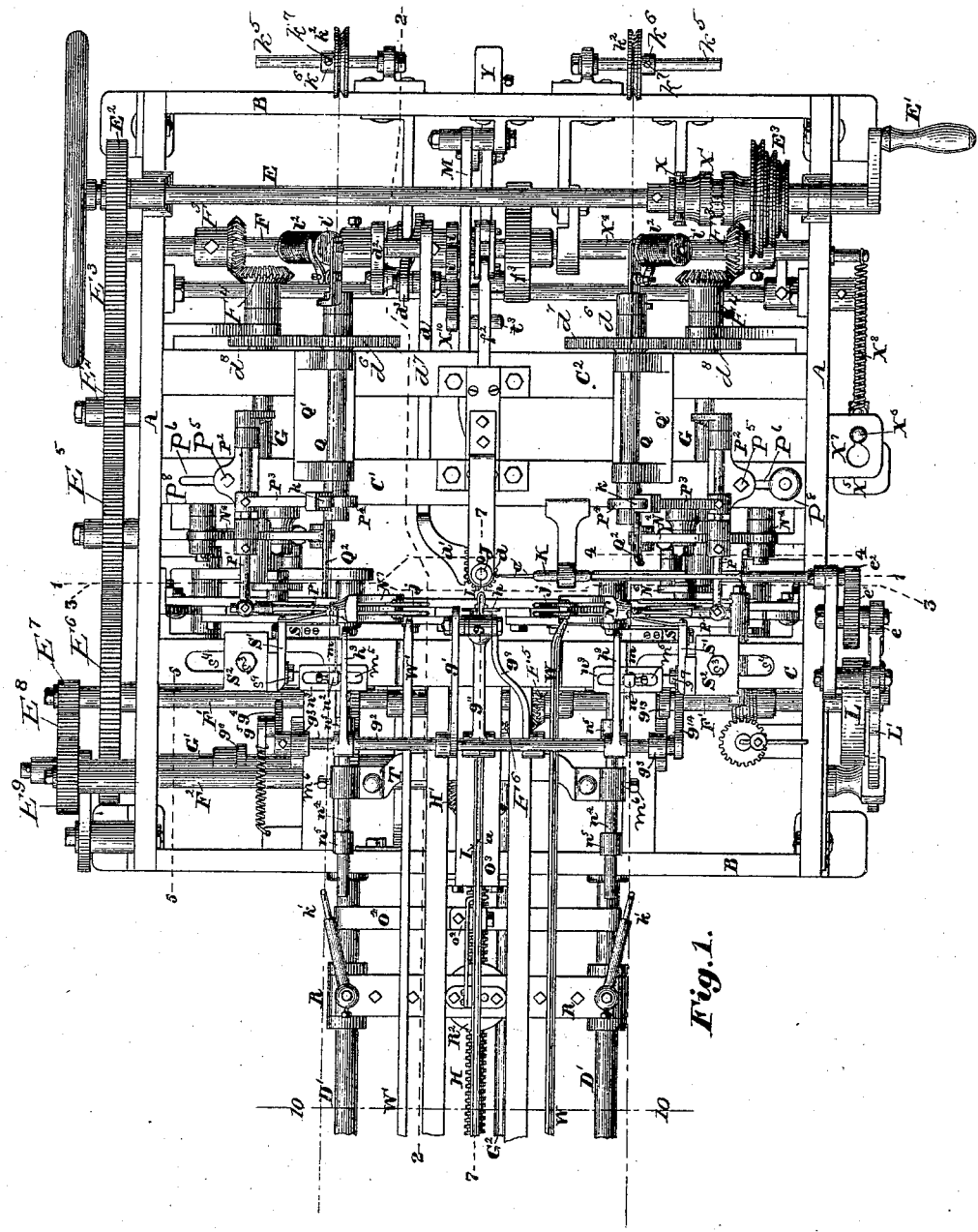

(No Model.) 10 Sheets—Sheet 1.

J. SLADDIN.
MACHINE FOR MAKING LOOM HARNESS.

No. 306,114. Patented Oct. 7, 1884.

Witnesses:
Walter E. Lombard
E. A. Hemmenway

Inventor:
Joseph Sladdin,
by N. C. Lombard
Attorney.

(No Model.) 10 Sheets—Sheet 3.

J. SLADDIN.
MACHINE FOR MAKING LOOM HARNESS.

No. 306,114. Patented Oct. 7, 1884.

Witnesses:
Walter E. Lombard.
E. A. Hemmenway.

Inventor:
Joseph Sladdin,
by N. C. Lombard
Attorney.

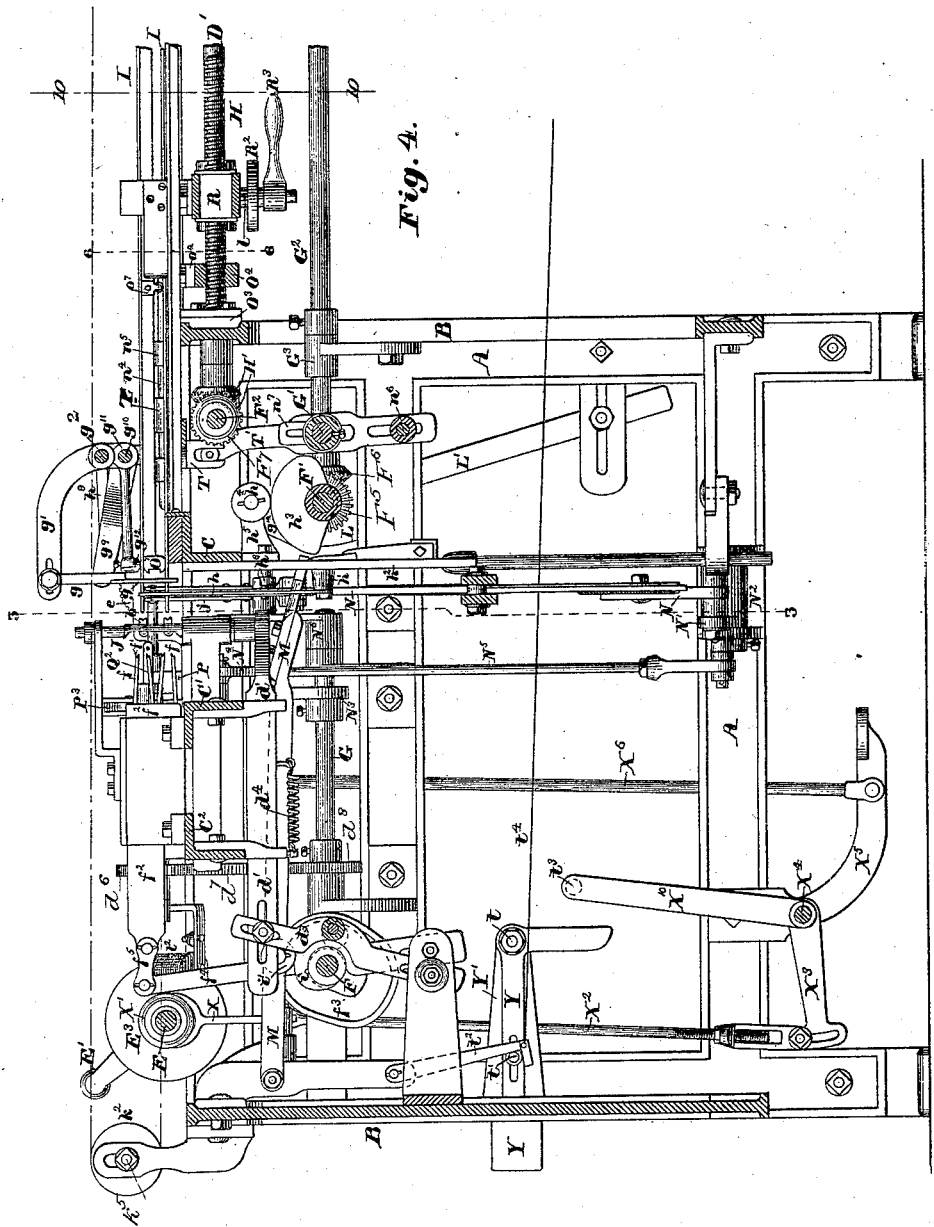

(No Model.)　　　　　　J. SLADDIN.　　　10 Sheets—Sheet 5.

MACHINE FOR MAKING LOOM HARNESS.

No. 306,114.　　　　　　　　Patented Oct. 7, 1884.

Witnesses:　　　　　　　　　　Inventor:
Walter E. Lombard.　　　　　Joseph Sladdin,
E. A. Hennneway.　　　　　by N. C. Lombard
　　　　　　　　　　　　　　　　Attorney.

N. PETERS, Photo-Lithographer, Washington, D. C.

(No Model.)
J. SLADDIN.
MACHINE FOR MAKING LOOM HARNESS.
No. 306,114. Patented Oct. 7, 1884.
10 Sheets—Sheet 6.
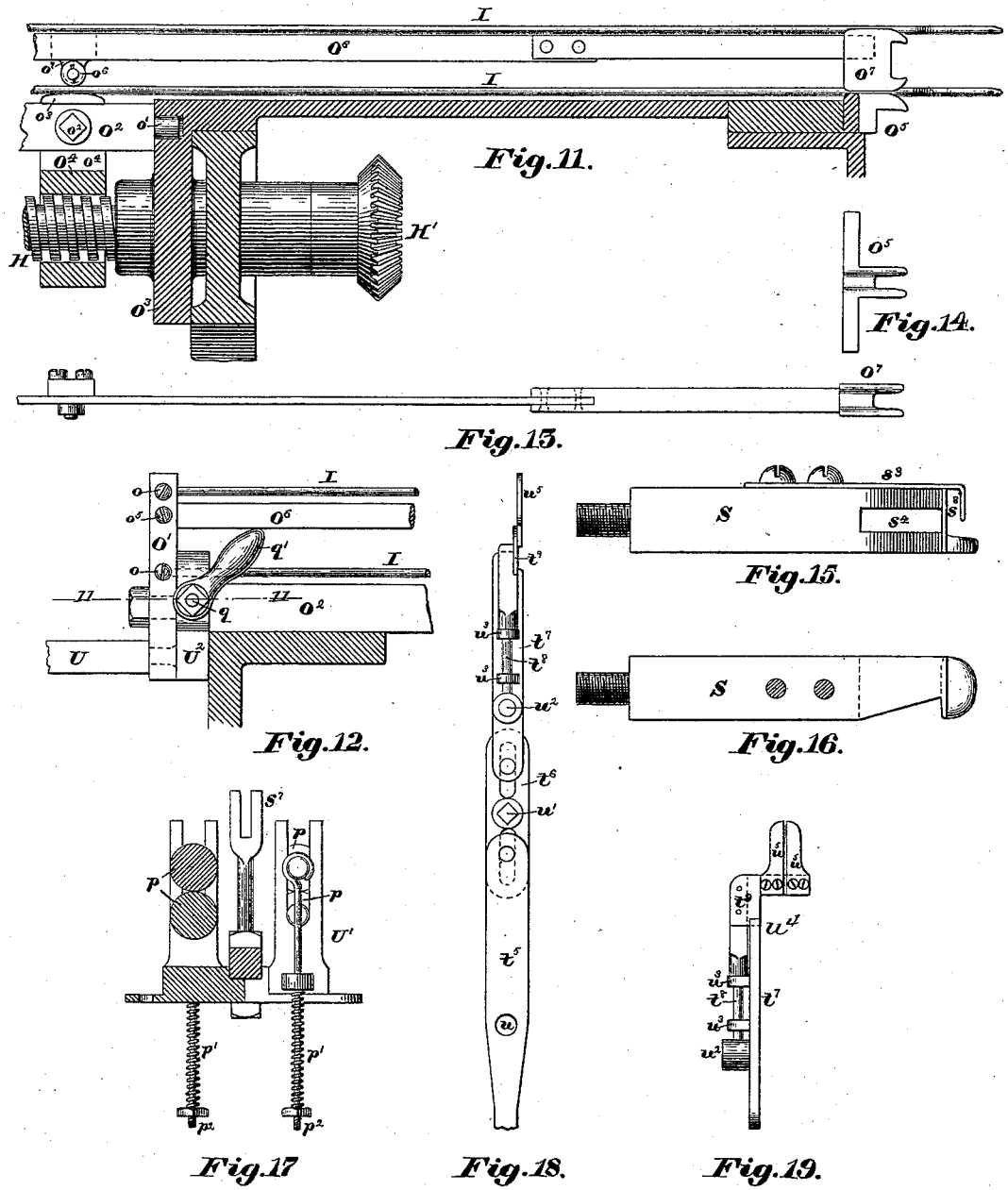
Witnesses:
Walter E. Lombard.
E. A. Hemmenway.
Inventor:
Joseph Sladdin,
by N. C. Lombard
Attorney.

(No Model.)

J. SLADDIN.

MACHINE FOR MAKING LOOM HARNESS.

No. 306,114. Patented Oct. 7, 1884.

10 Sheets—Sheet 7.

Witnesses:
Walter E. Lombard,
E. A. Hemmenway

Inventor:
Joseph Sladdin,
by N. C. Lombard
Attorney.

(No Model.) 10 Sheets—Sheet 8.
J. SLADDIN.
MACHINE FOR MAKING LOOM HARNESS.
No. 306,114. Patented Oct. 7, 1884.
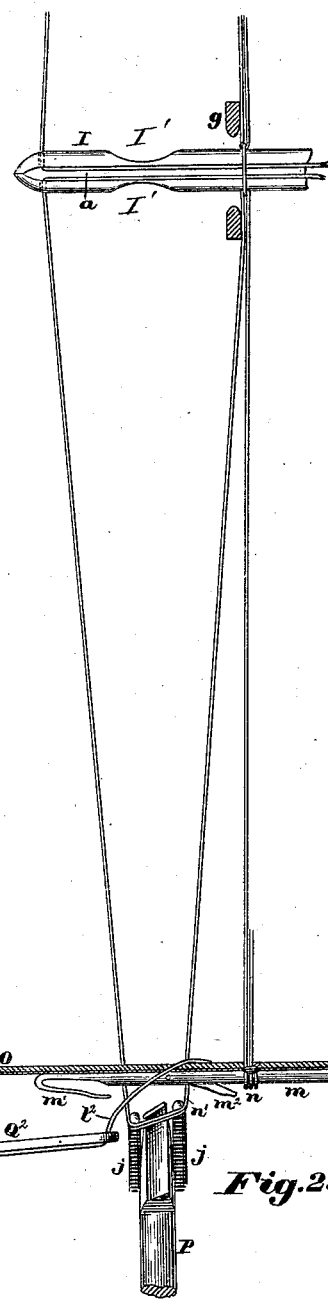
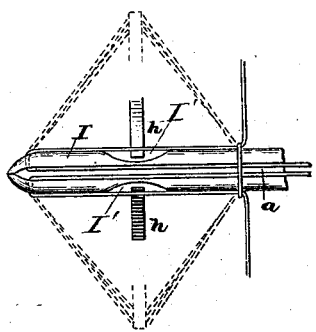
Fig. 22.
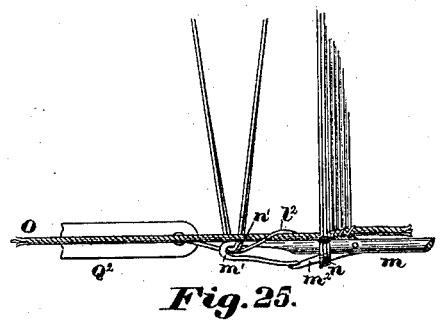
Fig. 25.
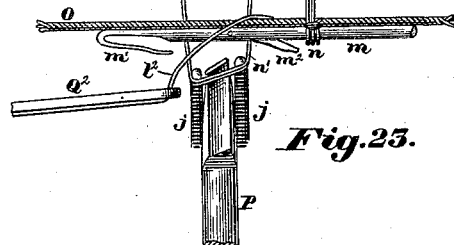
Fig. 23.
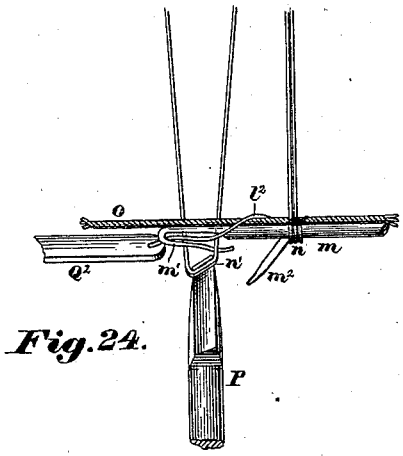
Fig. 24.
Witnesses:
Walter E. Lombard,
E. A. Hemmenway
Inventor:
Joseph Sladdin,
by N. C. Lombard
Attorney.

(No Model.) 10 Sheets—Sheet 9.
J. SLADDIN.
MACHINE FOR MAKING LOOM HARNESS.
No. 306,114. Patented Oct. 7, 1884.
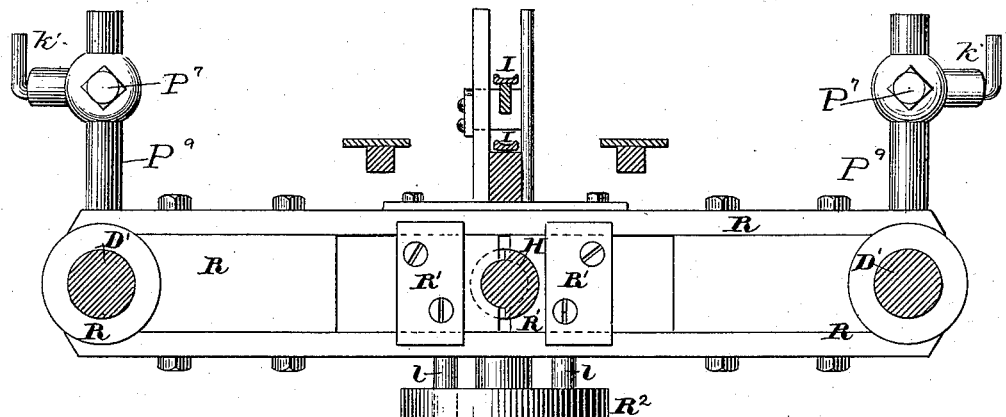
Fig. 26.
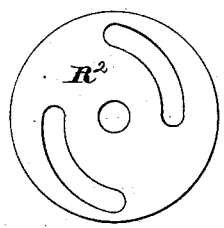
Fig. 27.
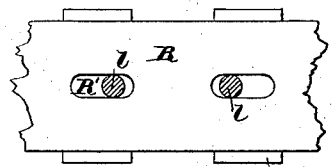
Fig. 28.
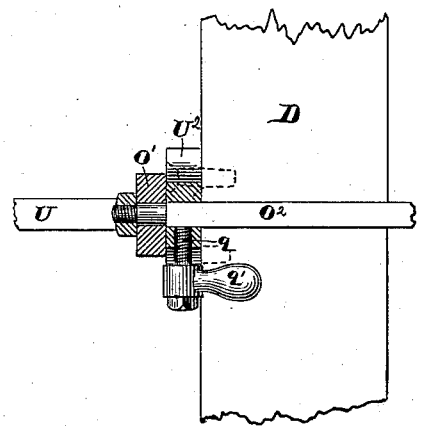
Fig. 29.
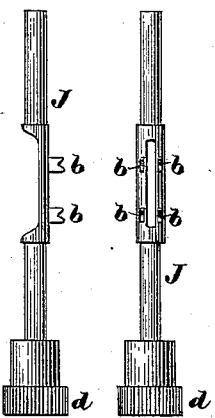
Fig. 30.—Fig. 31.
Witnesses:
Walter E. Lombard.
E. A. Hemmenway.
Inventor:
Joseph Sladdin,
by N. C. Lombard
Attorney.
N. PETERS. Photo-Lithographer, Washington, D. C.

(No Model.) 10 Sheets—Sheet 10.

J. SLADDIN.
MACHINE FOR MAKING LOOM HARNESS.

No. 306,114. Patented Oct. 7, 1884.

Witnesses:
Wm D Orcutt
Walter E. Lombard.

Inventor:
Joseph Sladdin,
by N. C. Lombard
Attorney.

UNITED STATES PATENT OFFICE.

JOSEPH SLADDIN, OF LAWRENCE, MASSACHUSETTS.

MACHINE FOR MAKING LOOM-HARNESS.

SPECIFICATION forming part of Letters Patent No. 306,114, dated October 7, 1884.

Application filed April 26, 1883. (No model.)

*To all whom it may concern:*

Be it known that I, JOSEPH SLADDIN, of Lawrence, in the county of Essex and State of Massachusetts, have invented certain new and useful Improvements in Machines for Making Loom-Harness, of which the following, taken in connection with the accompanying drawings, is a specification.

My invention relates to machinery for manufacturing that class of loom-harness which is made from yarn and has its eyes or heddles made by using two continuous lengths of said yarn, from one of which the heddle-eyes are made, while the other yarn is looped into one end of each and every heddle-eye in turn, and both yarns secured to the rig-bands to complete the harness.

My present invention is an improvement upon the machines described in Reissued Letters Patent Nos. 4,509 and 4,510, granted to me August 8, 1871, and Letters Patent No. 148,252, granted to me March 3, 1874; and it consists in certain combinations and arrangements of parts and details of construction, which will be best understood by reference to the description of the drawings, and to the claims to be hereinafter given.

My present invention is designed more especially for use in making an improved harness which forms the subject-matter of another application of mine, filed in the Patent Office at Washington, District of Columbia, February 23, 1883, and numbered 85,888.

Figure 2:
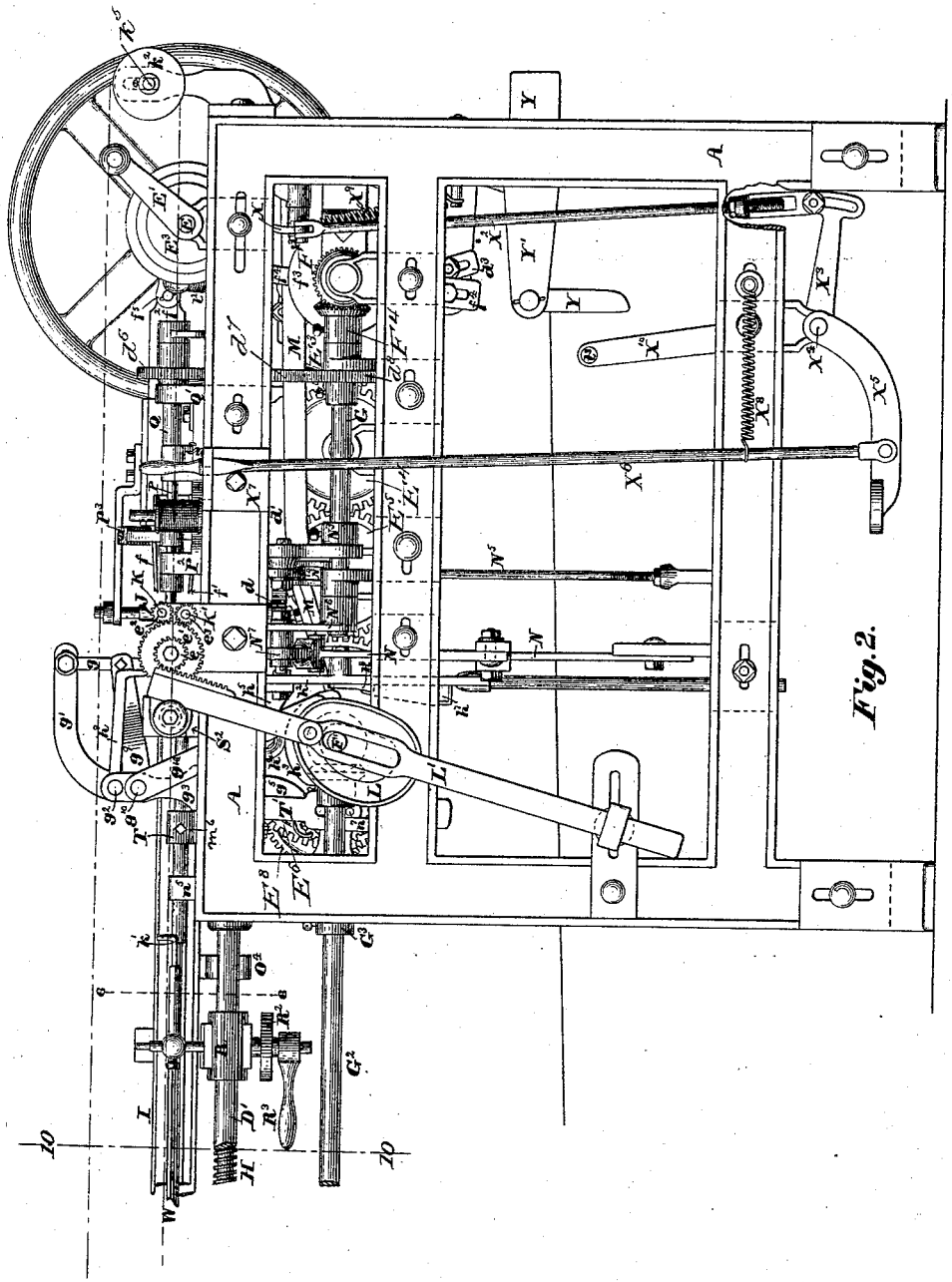
Figure 3:
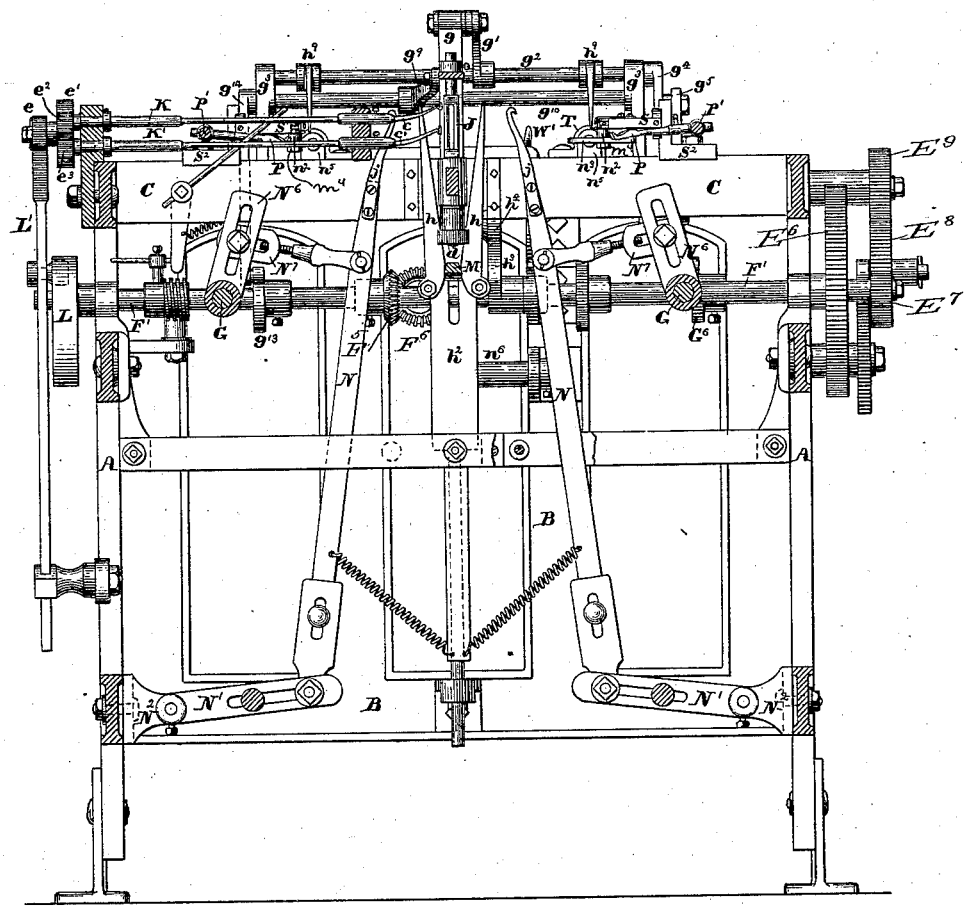
Figure 7:
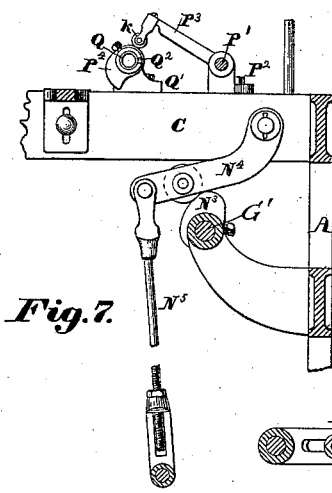
Figure 8:
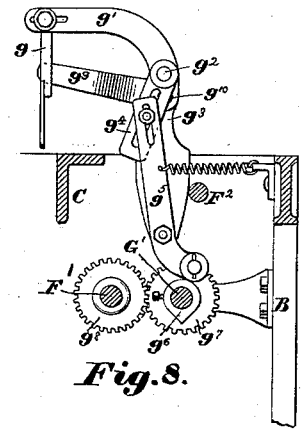
Figure 6:
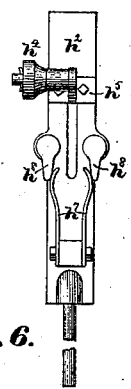
Figure 5:
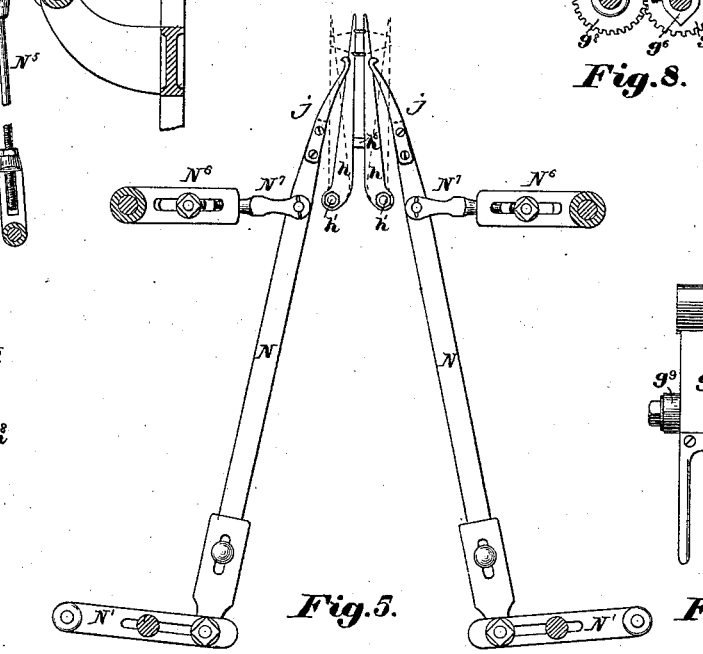
Figure 10:
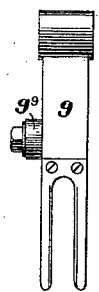
Figure 9:
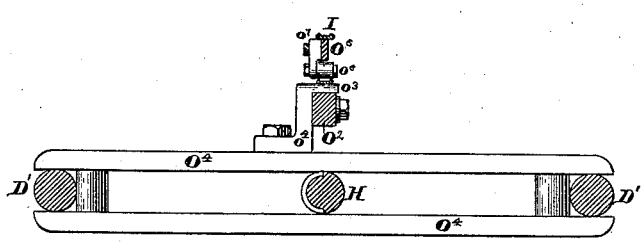
Figure 20:
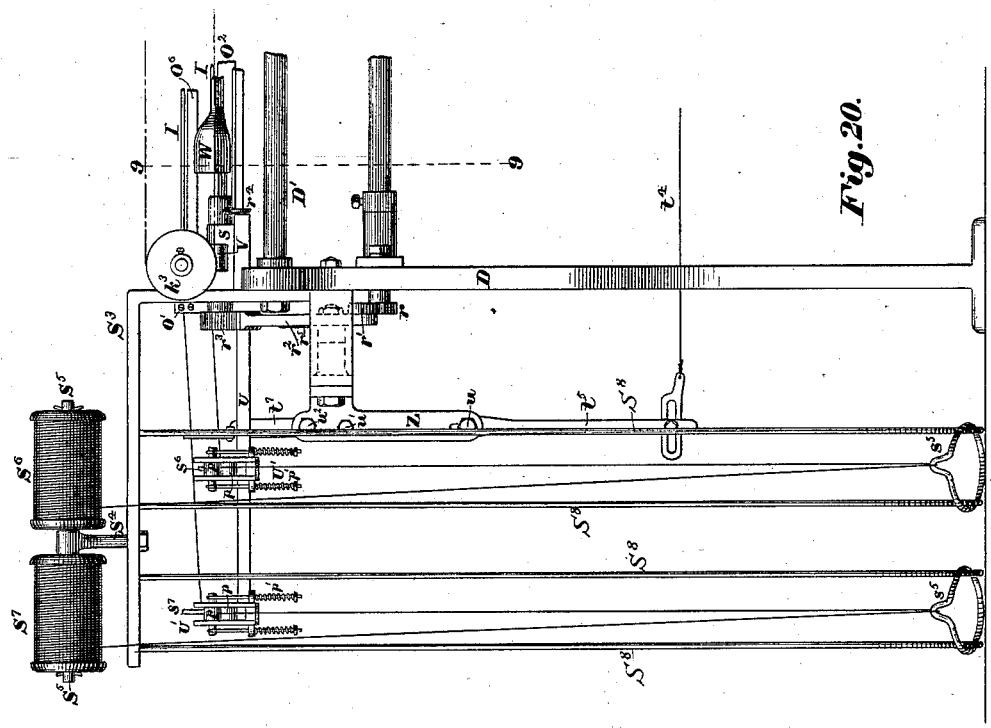
Figure 21:
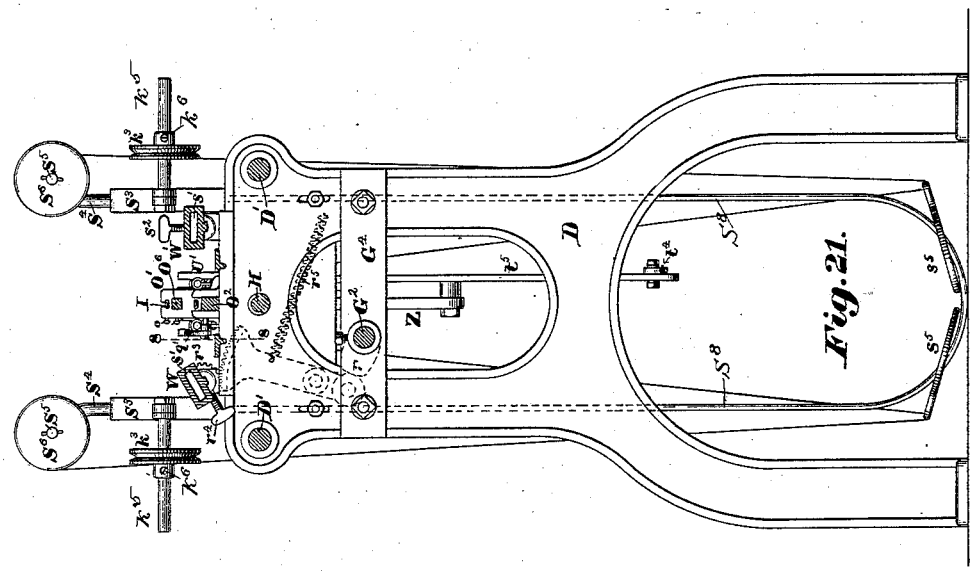

Figure 1 of the drawings is a plan of the head or main body of a machine embodying my invention. Fig. 2 is a side elevation of the same. Fig. 3 is a vertical transverse section on line 1 1 on Fig. 1, looking toward the rear end of the machine, and showing the twisters in elevation. Fig. 4 is a vertical longitudinal section on line 2 2 on Fig. 1. Fig. 5 is a partial sectional elevation, the cutting-plane being on line 3 3 on Figs. 1 and 4, showing an end view of the heddle-needles and the loop-forming fingers and loop-transferring hooks in the positions they occupy when the fingers are just ready to draw out the loops. Fig. 6 is a back side elevation of the loop-finger-carrying slide. Fig. 7 is a partial vertical section on line 4 4 on Fig. 1, looking toward the right-hand side of said figure. Fig. 8 is a partial vertical section on line 5 5 on Fig. 1, looking toward the center of the machine, and showing the heddle-retainer and parts immediately connected therewith. Fig. 9 is a vertical transverse section on line 6 6 on Figs. 2 and 4 enlarged. Fig. 10 is a front elevation of the heddle-eye holding-fork drawn to an enlarged scale. Figs. 11 and 12 are partial vertical sections on line 7 7 on Fig. 1 and line 8 8 on Fig. 21, and showing portions of the front and rear ends of the heddle-needles, their bars, and the screw-shaft in elevation. Fig. 13 is a plan of a portion of the upper needle-supporting bar. Fig. 14 is a plan of the shoe for supporting the front end of the lever heddle-needle. Figs. 15 and 16 are respectively an elevation and a plan, with upper plate removed, of one of the rig-band guides. Fig. 17 is a sectional elevation of a special yarn-tension-regulating device. Fig. 18 is an elevation of the series of levers for stopping the machine by the action of a knot in the yarn. Fig. 19 is a rear elevation of the upper part of the same. Fig. 20 is a side elevation of a portion of the rearward extension of the machine, and Fig. 21 is a sectional elevation on line 9 9 on Fig. 20. Figs. 22, 23, 24, and 25 are diagrams illustrating the formation of the stitch connecting the loops to the rig-band. Fig. 26 is a vertical transverse section on line 10 10 on Figs. 1, 2, and 4, and showing the carriage R in elevation. Fig. 27 is a plan of the cam-disk for operating the bifurcated nut to engage it with the feed-screw. Fig. 28 is a partial inverted plan of the carriage R. Fig. 29 is a horizontal section through plate O' and stand U² on line 11 11 on Fig. 12, and showing the bar O², the screw $q$, and handle $q'$ in elevation; and Figs. 30 and 31 are two elevations, at right angles to each other, of the vertical shaft and heddle-forming ears carried thereby. Figs. 32, 33, 34, 35, and 36 are details to be hereinafter referred to.

In the drawings, A A are the side frames of the head or main body of the machine, B B are the end frames, and C C' and C² tie-girts by which the side frames, A A, are connected together to form a rectangular structure, upon which the main operating parts are mounted.

D is the end frame of the rearward extension of the machine, the same being connected to the rectangular structure constituting the head of the machine by the tie-rods D' D', as shown.

E is the driving-shaft, mounted in suitable bearings, and having firmly secured to one end thereof the crank E', and to its other end the spur-gear wheel E², which engages with, and imparts motion to, a train of gear-wheels, E³, E⁴, E⁵, and E⁶ upon the side of the machine opposite to the crank end of the driving-shaft, through which rotary motion is imparted to the shafts F, F', and F², and through them and suitable bevel gear-wheels, F³ F⁴, spur-gear wheels E⁷, E⁸, and E⁹, and bevel gear-wheels F⁵ F⁶ and H' H', motion is imparted respectively to the shafts G, G, G', and G² and screw H. The driving-shaft E has mounted loosely thereon the cone-pulley E⁹, which, by means of a suitable clutch and shipping mechanism, hereinafter described, may be connected to said shaft, so as to compel said shaft to revolve therewith, motion being imparted to said cone-pulley by means of a suitable belt leading therefrom to an overhead shaft or other prime mover, (not shown.) I use in this machine two stationary needles, I I, arranged one above the other, and each provided in its upper side with a longitudinal groove, $a$. Along each groove two yarns, from which the heddles and loops of the harness are to be formed, are led to the two eyes in the front end of each needle, in substantially the same manner as described in the Letters Patent No. 148,252, before cited.

J is a vertical slotted shaft, mounted in suitable bearings, and provided with the two pairs of horizontally-projecting ears or formers $b$, around which the yarns are wound by the twisters $c$ $c'$, mounted in the inner ends of the shafts K and K', respectively, precisely in the same manner as described in the Letters Patent No. 4,509, reissued to me August 8, 1871, except that in this case the result is doubled, as the eye-forming mechanism is duplicated, said shaft J having secured thereon the pinion $d$, with which the rack-teeth on the inner end of the bar $d'$ engage, and impart to said shaft J an intermittent rocking motion about its axis to the extent of one-quarter of a revolution, so that the heddle-eye formers $b$ $b$ alternately point toward the needles I I and toward the twister-shafts K and K', said bar $d'$ having an intermittent reciprocation imparted thereto for this purpose by the cam $d^2$ on the shaft F, which acts through the lever $d^3$ to move it in one direction, the spring $d^4$ serving to move the said bar $d'$ in the opposite direction. The twister-shafts K and K' have an intermittent reciprocating rotary motion imparted thereto by the cam L on the end of the shaft F', acting through the medium of the reciprocating rack L', the pinion $e$, gear-wheel $e'$, and pinions $e^2$ and $e^3$, all of the parts mentioned in this paragraph being constructed and arranged to operate substantially as described in said last-cited Letters Patent. Two pairs of push-fingers, $f$, each provided with a shoulder, $f'$, are set in the inner end of the bar $f^2$, to which a reciprocating endwise movement is imparted by the cam $f^3$ on the shaft F, acting through the lever $f^4$ and link $f^5$, said fingers being thereby moved endwise through the slot in the shaft J. The fingers serve to transfer the heddle-eyes from the formers $b$ to the needles I I, the push-fingers $f$ being so arranged relative to the needles I I, and so operated that as they are moved toward the needles their shoulders $f'$ abut against the yarn of the heddle-eyes as it rests upon the formers $b$, and carry the eyes onto the ends of the needles, one of said push-fingers passing above and another beneath each needle I I. The motion of the push-fingers $f$ continues till the heddle-eyes are moved along the needles to a point in the rear of the heddle-eye retainer $g$, hereinafter described, when said forward motion ceases, and the fingers $f$ remain stationary till the forked retainer $g$ has descended in front of said eyes, when the fingers are moved backward till they are withdrawn from the slot of the shaft J, after which said shaft is turned a quarter of a revolution with the eye-formers $b$ toward the twisters, when two more eyes are formed thereon preparatory to being in like manner transferred to the needles I I. The pushing of the heddle-eyes back upon the needles I I causes the yarns from which said eyes and the loops connecting them to the rig-bands are formed to be drawn through the several eyes in the points of the needles and along the outer edges of the needles to said heddle-eyes, which have been pushed to the rear of the contracted portions I' of said needles, as shown in Fig. 22. A pair of pointed fingers, $h$ $h$, are hinged by independent pivots $h'$ $h'$ to the upright bar $h^2$, arranged to be intermittently reciprocated vertically by the cam $h^3$ upon the shaft F' acting through the medium of the truck $h^4$ and the bracket or arm $h^5$, said bar $h^2$ being mounted in suitable guiding-bearings, as shown. The lower portions of the inner edges of the fingers $h$ $h$ are curved or cam-shaped, as shown, and are acted upon by the beveled sides of the inner end of the lever M for the purpose of moving the pointed upper ends of said fingers $h$ $h$ outward or away from the needles I I, said lever M being vibrated for this purpose by the cam $i$ on the shaft F acting upon the truck $i'$, mounted upon a pin set in the side of said lever, as shown in Figs. 1 and 4. These fingers $h$ $h$, when in their lowest positions, have their upper ends below the lower needle, and at such a distance apart that when they are moved upward they pass between the needles and the yarn that is drawn from the eyes in the ends of the needles along the outside of the needles to the heddle-eyes previously formed, said fingers being pressed hard against the stop-pin $h^6$ by the springs $h^7$ acting upon the short arms $h^8$, secured upon the back ends of the pivots $h'$ $h'$, as shown in Figs. 5 and 6. When the bar $h^2$ and the fingers $h$ $h$ have completed their upward movement, an upward movement of the inner end of the lever M forces said fingers to move about their pivotal axes, drawing out therewith a loop of yarn upon each side of each of the needles I I, as shown in dotted lines in Figs. 5 and 22.

N N are two levers arranged upon opposite sides of the central vertical plane occupied by the needles I I, each having its upper end forked to form, or having secured thereto, the two hooks, $j\,j$, and being pivoted at its lower end to the movable end of a lever, N', pivoted to the stand N², as shown in Fig. 3. Each of the levers N and hooks $j\,j$ has an intermittent endwise movement imparted thereto by a cam, N³, on the shaft G acting through a lever, N⁴, rod N⁵, and the lever N', (see Fig. 7,) and a vibrating motion about its pivotal connection to the lever N' is imparted to each of the levers N by the crank N⁶, carried by each of the shafts G, and acting through the connecting-rod N⁷, as shown in Figs. 3 and 5, and substantially as described in the Reissued Letters Patent No. 4,509, hereinbefore cited. The endwise and vibratory motions of the levers N are so adjusted and timed that the hooks $j\,j$ in their upward movement pass within the loops of yarn just previously drawn out by the fingers $h\,h$, and as the levers N vibrate said hooks engage with the two loops upon each side of the heddle-needles, and, taking them from the fingers $h\,h$, carry them beneath and a short distance beyond the rig-bands O, as shown in Fig. 23, when said loops are lifted from said hooks $j\,j$ by the upward movements of the hooks P, mounted upon the short shafts P', having their bearings in the adjustable stands P², and each carrying a lever, P³, having mounted in its movable end a truck, $k$, upon which the cam P⁴ on sleeve-shaft Q acts to vibrate the hook P. (See Figs. 1, 3, and 7.) The rig-bands are each secured by one end to the adjustable arm $k'$, mounted on the carriage R, and after passing under and partially around the adjustable grooved pulley $k^2$ at the front end of the machine extend to the rear of the extension, over, partially around, and beneath the adjustable grooved pulley $k^3$, and thence forward to the arm $k'$, and is again secured thereto without cutting the twine from the spool or bobbin, which may stand on end on the floor below the carriage R. The stands P² are secured in position by bolts P⁵, which pass through slots P⁶ in the girts P⁸, on which they are mounted, in such a manner that they may be readily adjusted toward or from the center of the machine. The arms $k'$ are mounted upon vertical cylindrical studs P⁹, about which they may be vibrated to adjust their movable ends to which the rig-bands are secured to a greater or less distance from the center of the machine, said arms being secured in the desired positions by means of set-screws P⁷, as shown in Figs. 1, 2, and 26, and the pulleys $k^2$ and $k^3$ are mounted loosely upon the horizontal studs $k^5$, so as to revolve freely thereon, and are maintained at the desired distance from the center of the machine by the draft or strain of the rig-bands and the collars $k^6$, which are secured at a greater or less distance from the center of the machine by the set-screws. The carriage R is connected at will to the screw-shaft H by means of a divided nut, the two halves R' R' of which are arranged to be moved toward and from each other and the screw H by the cam-disk R², the cam-slots in which act upon pins $l$, set in said half-nuts in a well-known manner, said disk being rotated by the handle R³. The screw-shaft H is mounted in bearings in the rear end of frame B of the head of the machine and the frame D of the rearward extension, and is connected to and receives motion from the shaft F² by means of the bevel gear-wheels H', as shown in Fig. 4. The carriage R is moved to the rear, or away from the heddle-forming devices, by the screw H, and carries with it that part of the rig-band to which the harness is being woven or knitted at a speed corresponding to the accumulation of the stitches formed upon the rig-band, said carriage being guided by the tie-rods D' D', upon which it has its bearings.

Figure 32:
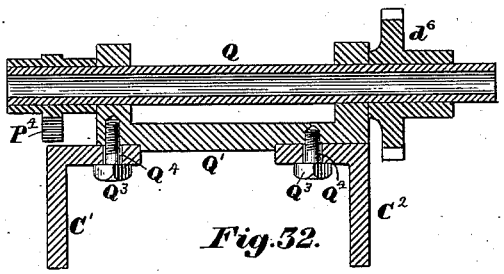

Q Q are hollow shafts mounted in bearings in the stands Q', secured to the tie-girts C' and C² by means of bolts Q³, which pass through longitudinal slots Q⁴ in said girts and screw into said stands, so that said stands may be readily adjusted to a greater or less distance from the center of the machine, for the purpose of adapting the machine to make harness of different widths, as shown in Fig. 32, and each carry at one end the spool $l'$, upon which is wound a twine, $l^2$, which I term the "binding-cord," and which is led therefrom through the hollow shaft Q and through the two eyes in the finger Q², secured to and projecting beyond the opposite end of the shaft Q, and thence to the last-formed stitch on the rig-band, which latter also passes through the center of said hollow shaft Q in such a manner that at each revolution of said shaft the binding-cord $l^2$ is wound around the rig-band O and needle $m$, as illustrated in Figs. 23, 24, and 25. Rotary motion is imparted to the shafts Q Q from the shafts G G by means of the spur-gear wheels $d^6$, $d^7$, and $d^8$, as shown in Figs. 1, 2, and 4. The heddle-retainer $g$ is pivoted to the movable end of the curved lever $g'$, secured upon the rocker-shaft $g^2$, mounted in the stands $g^3$ $g^3$, and to which an intermittent oscillating motion about its axis is imparted by means of the slotted arm $g^4$, the lever $g^5$, and the cam $g^6$, mounted upon the shaft G', to which rotary motion is imparted from the shaft F' by means of the spur-gear wheels $g^7$ and $g^8$, as shown in Fig. 8. The forked heddle-eye retainer $g$ is also connected at or near the middle of its length to the movable end of the lever $g^9$, mounted loosely upon the shaft $g^{10}$, also mounted in bearings in the stands $g^3$ $g^3$, as shown in Fig. 3.

The object of connecting the heddle-eye retainer $g$ to the loosely-mounted lever $g^9$ is to maintain said heddle-eye retainer in a perpendicular position, or nearly so, during its upward and downward movements.

Figures 33, 34:
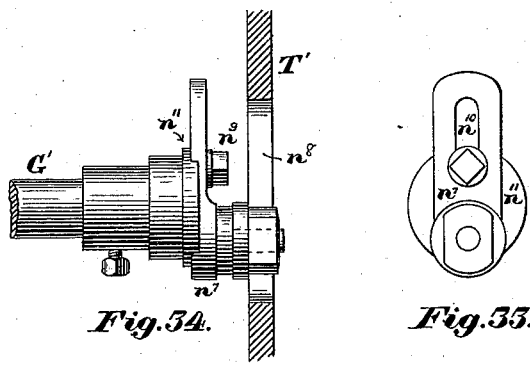

The shaft $g^2$ also has secured thereon the two knee-shaped push-back fingers, $h^9$ $h^9$, which serve to prevent the loops last formed around the rig-band and the stitch-forming needles $m$ from being carried forward by said needles as they advance to engage with new loops preparatory to drawing them through said previously-formed loops. The successive pairs of loops drawn out from the heddle-needles to the rig-bands by the hooks $j\,j$, and lifted therefrom by the hooks P P, are seized by the hooks of the latch-needles $m\,m$, together with the binding-cords $l^2\,l^2$, and drawn through the previously-formed loops by the rearward movements of said needles, which engage only with one side of said loops by virtue of the fact that the rearward side of each of said loops is raised to a higher level than the front portion or side, which is caused by the form of the notch in the end of the hook P in which the end of the loop rests, which notch is oblique to the axis of said hook and inclined to a horizontal plane. In Figs. 23, 24, and 25 $m$ is the needle, provided with the hook $m'$ and pivoted latch $m^2$. O is the rig-band, $l^2$ the binding-cord, $Q^2$ the binding-cord-carrying finger, $j\,j$ the loop-carrying hooks, P the lifting-hook. $n$ is the previously-formed stitch, and $n'$ are the loops of yarn from which the next stitch is to be formed. The needles $m\,m$ are firmly secured in the posts or studs $n^2\,n^2$, adjustably secured by means of the nuts $m^4\,m^4$ (see Fig. 3) in the slots $m^5$, formed in the plates $n^3$, secured to or forming a part of the rods $n^4$ in such a manner that the studs $n^2$ and needles $m$ may be adjusted to a greater or less distance from the center of the machine, for the purpose of adapting the machine to make harnesses of different widths. The rods $n^4\,n^4$ are mounted in bearings $n^5\,n^5$, and are adjustably secured in eyes formed in opposite ends of the cross-head T by means of the set-screws $m^6$, so that said rods $n^4$ may be readily moved endwise in said cross-head, for the purpose of adjusting the needles $m\,m$ to the proper position for forming the stitches upon the rig-bands. A positive reciprocating motion is imparted to the rods $n^4\,n^4$ and the needles $m\,m$ by means of the lever T', fulcrumed upon the stand $n^6$, and provided with the longitudinal slot $n^8$, and the crank $n^7$, adjustably secured to the shaft G' by means of the bolt $n^9$, which passes through the slot $n^{10}$, formed in said crank, and screws into the hub $n^{11}$, secured upon the shaft G', said crank being prevented from turning upon the hub $n^{11}$ by being fitted into a groove formed therein, as shown in Figs. 33 and 34, said adjustment of the crank $n^7$ being for the purpose of varying its throw. The shaft $g^{10}$ has firmly secured thereon the arm $g^{11}$, to the movable end of which is secured the shoe $g^{12}$, arranged to rest upon the upper heddle-eye needle, I, or the heddle-eyes thereon, and to be intermittently raised therefrom by a rocking motion imparted to the shaft $g^{10}$ by the cam $g^{13}$ on the shaft F' acting upon the lever $g^{14}$, secured to one end of said shaft $g^{10}$, as shown in Figs. 1, 2, and 3. The two heddle-needles I I extend to the frame D of the rearward extension of the machine, and are secured by set-screws $o\,o$ to the vertical plate O', which in turn is firmly bolted to the rear end of the rectangular bar $O^2$, the forward end of which has formed thereon the pin $o'$, which enters a hole in the rear end of the plate $O^3$, (see Fig. 11,) said end being connected by the bolt $o^2$ to the carriage $O^4$, so as to be supported thereby when the bar $O^2$ with the needles I I are moved to the rear for removing the harness when completed, as hereinafter described. The carriage $O^4$ is composed of two bars arranged parallel to each other, one above and the other below the guide or tie-rods D' D', and connected together by two studs, as shown in Fig. 9. The lower heddle-needle, I, is supported near its front end upon the forked shoe $O^5$, (shown in plan in Fig. 14,) and at another point in its length upon the curved upper surface of the plate $o^3$, secured to or forming a part of the ear $o^4$ of the carriage $O^4$, and projecting over the upper surface of the bar $O^2$, all as shown in Fig. 11.

$O^6$ is a bar, also connected at its rear end by set-screw $o^5$ to the vertical plate O', and having secured to its front end the forked shoe $O^7$, which rests upon the lower heddle-needle I, and supports the front end of the upper heddle-needle, as shown in Figs. 11, 12, and 13. The upper surface of the shoe $O^5$ is curved downward at its forward end, and the upper and under surfaces of the shoe $O^7$ are in like manner curved, respectively, downward and upward at its forward end, as clearly shown in Fig. 11, for the purpose of facilitating the feeding of the heddle-eyes along the needles I I.

U is a bar, firmly secured to and projecting backward from the plate O', and having mounted thereon suitable housings, U' U', in each of which are mounted two pairs of tension-rolls, $p\,p$, the upper rolls of which are drawn downward by the springs $p'\,p'$ acting upon the rods $p^2\,p^2$, as shown in Figs. 17 and 20. The bar $O^6$ is supported directly over the carriage $O^4$ by the truck or roll $o^6$, mounted upon a stud set in the stand $o^7$, secured to the side of the bar $O^6$, said truck or roll resting upon the lower heddle-needle, directly above where said needle rests upon the curved upper surface of the plate $o^3$, as shown in Figs. 11 and 13. The needles I I and the bar $O^6$ are made as light as is consistent with the proper working of the machine, so that the heddle-eyes may be easily moved along said needles, the yarns passing between said needles and the shoes $O^5$ and $O^7$, and between the lower needle and the plate $o^3$ and the roll $o^6$.

$U^2$ is a slotted or forked stand secured to the frame D, and provided with the set-screw $q$, having the handle $q'$, by which the bar $O^2$ with the bar $O^6$, needles I I, bar U, and housings U' U' are firmly secured in fixed positions, when desired, and by turning said set-screw a single half-revolution all of the bars $O^2$, $O^6$, and U, the needles I I, the plate O', and the carriage $O^4$ may be released and moved to the rear sufficiently far to withdraw the needles I I from the harness when completed, the carriage $O^4$ being guided and supported in its backward movement by the tie-rods D' D'. The shaft G² has its bearings in the stand G³, bolted to the rear end frame, B, of the head of the machine, and in the stand or bar G⁴, secured to the inner side of the frame B of the extension, and has secured to its rear end the cam $r$, which acts upon a roll or truck, $r'$, mounted upon a stud set in the lower end of the lever $r^2$, the upper end of which is a segment of a spur-gear, the teeth of which mesh into the teeth of the spur-pinion $r^3$, mounted upon the rear end of the short shaft V, having bearings in the stand $s$, and to which is coupled, by means of the set-screw $r^4$, the lease-rod W, to which an intermittent oscillating motion is imparted by the combined action of the cam $r$ and the spring $r^5$. (Shown in dotted lines in Fig. 21.) The lease-rod W extends forward to a point just beyond the vertical plane in which the loops are connected to the rig-bands, and has its end bent to an angle to its main body, so that it serves to guide the loops, connecting the heddle-eyes with the rig-band above or below said rod, according as the bent part thereof is directed downward or upward, which operation is necessary in order to form the "lease" so called. The lease-rod W has secured to its rear end the rectangular socket $s'$, to receive the end of the harness-shaft when it is desired to introduce said shaft into the harness, which is readily done by simply loosening the thumb-screw $r^4$ and pushing the lease-rod W with said harness-shaft through the harness toward the front end of the machine till the lease-rod has passed entirely out of the harness and the harness-shaft has taken its place, the forward end of the socket $s'$ being gradually reduced by curved surfaces to the size of the lease-rod, so as to present no obstruction to the passage of said lease-rod and socket between the yarns of the harness. At the opposite side of the heddle-needle is a rod, W', corresponding to the lease-rod W, except that its front end is not bent, that is, provided with the socket $s'$, and is connected by means of the thumb-screw $s^2$ to a second shaft, V, but is not designed to be oscillated, its only office being to separate the yarns leading from the heddle-eyes to the rig-band upon that side of the machine, one half of which yarns are drawn over and the other half under the front end of said rod W' in the operation of drawing out said yarns, securing them to the rig-bands, and to serve as a convenient medium of inserting the other harness-shaft between the yarns of the harness, as before described, in connection with the lease-rod W.

Figures 35, 36:
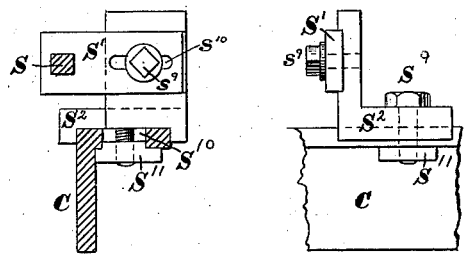

S S are two rig-band guides, each composed of the main body S and the steel plate $s^3$, secured thereto by screws, and having its inner end turned downward, thus forming in the inner ends of said guides L-shaped slots $s^8$, as shown in Fig. 15, between which turned-down portion of the plate $s^3$ and the abutment formed by the upper portion of the inner end of the main body S the rig-band with the stitches formed thereon passes. The main body of said guide has a slot, $s^4$, formed therein for the passage of the latch-needle $m$. These guides serve to keep the rig-bands at the exact required distance apart at or near the point where the stitches are formed which unite the heddle-loops to the rig-bands. The guides S S are firmly secured to the arms S', which are in turn secured to the stands S² by means of bolts $s^9$, which pass through slots $s^{10}$ in the arms S', and screw into the stands S², so that said guides S S may be adjusted in the direction of the length of the rig-bands, to bring them to the desired point for connecting the heddles to the rig-bands. The stands S² are in turn secured to the girt C by means of the bolts S⁹, which fit holes in said stands S², pass through slots S¹⁰ in the girts C, and screw into clamping bars or nuts S¹¹, as shown in Figs. 35 and 36, so that said stands may be adjusted to a greater or less distance from the heddle-needles, to adapt the machine for making harnesses of different widths.

To the rear side of the upper portion of the frame D are bolted the two arms S³ S³, which extend backward therefrom, and have set in their upper sides the standards S⁴, in which are set the horizontal spindles S⁵, upon which are mounted the spools S⁶ and S⁷, two of each, which contain the yarns from which the heddle eyes and loops are to be formed. The yarns from the spools S⁶ pass downward therefrom through the ring-weights $s^5$, embracing and arranged to move up and down on the wires $s^8$, then between the forward pairs of tensions-rolls $p$ $p$, through the forked upright $s^6$, along the groove in the upper side of the lower heddle-needle, I, and through the eyes in the point of said needle, one upon either side thereof, and are drawn backward along the outer edges of said needle, and secured thereto in the rear of the forked heddle-retainer $g$. In like manner the yarns from the spools S⁷ pass downward therefrom through ring-weights $s^5$, between the rear pairs of tension-rolls, through the forked upright $s^7$, along the groove in the upper side of the upper heddle-needle, to and through the eyes at the point of said needle, and are secured thereto in like manner as the other yarns are secured to the lower needle.

X is the shipper-lever mounted upon a fixed fulcrum engaging by its forked end with the sliding half X' of the clutch, and connected by its horizontal arm to the upper end of the rod X², the lower end of which is connected to the lever X³, firmly secured upon the rocker-shaft X⁴, to the end of which is also firmly secured the treadle-lever X⁵, having pivoted thereto the rod X⁶, the upper end of which has formed thereon a handle, which projects above the stand X⁷, through an opening in which said rod passes, and with the side of which a notch formed in said rod engages when the clutch is thrown out of gear by pressing upon the treadle-lever X⁵, or pushing down upon the handle end of the rod X⁶, the spring X⁸ serving to cause such engagement of the rod X⁶ with the stand X⁷. A spring, X⁹, is attached to the horizontal arm of the shipper-lever X in such a manner that when the notch in the rod X⁶ is disengaged from the stand X⁷ the said spring will cause the sliding part X of the clutch to engage with the half formed with the cone-pulley E³, thereby causing the shaft X⁴ to move about its axis and the treadle-lever X⁵ and the rod X⁶ to be moved upward.

Y is a weighted elbow-lever pivoted at $t$ to the stand Y′, and provided with the pin $t′$, with which the pivoted catch-lever $t^2$ engages to hold the weighted long arm of the lever Y in a horizontal position, as shown in Fig. 4.

X¹⁰ is a lever firmly secured upon the shaft X⁴, and provided with the horizontally-projecting pin $t^3$, so arranged that when the clutch is in gear said pin will be in close proximity to the edge of the pendent arm of the weighted lever Y and directly in its path of motion, so that a movement of the lever Y, caused by the falling of its weighted end, will cause the clutch to to be thrown out of engagement, and thus stop the machine. The lower end of the catch-lever $t^2$ is connected by the wire $t^4$ to the lower end of the lever $t^5$, which is pivoted at $u$ to the stand Z, secured to the frame D, as shown in Fig. 20, and is connected at its upper end, as shown in Fig. 18, to the lower end of the lever $t^6$, which is also pivoted to the stand Z at $u′$, and is connected at its upper end to the lower end of the lever $t^7$, which has its fulcrum at $u^2$, and is provided with the laterally-projecting ears $u^3 u^3$ in bearings, in which is mounted the upright bar $t^8$ in such a manner that it may be turned or partially rotated in said bearings, and provided at its upper end with a horizontally-projecting plate, $t^9$, the lower edge of which engages at $u^4$ with a notch in the upper end of the lever $t^7$, and has secured thereto the fingers $u^5 u^5$, which are set just far enough apart to permit the free passage of the yarns when said yarns are of the proper regulation size. If, however, a knot, knob, or other enlargement of the yarn is brought to said fingers, it will not pass through the slit between them, but will strike against them, and thus vibrate the series of levers $t^7$, $t^6$, and $t^5$ in such a way as to draw upon the wire $t^4$ and remove the catch $t^2$ from beneath the pin $t′$, when the weighted end of the lever Y will fall, causing its pendent arm to strike the pin $t^3$ with sufficient force to operate the shipping mechanism and disengage the driving-pulley, and thus stop the machine. The fingers $u^5 u^5$ are directly in the rear of the heddle-needles I I and their supporting-plate O′, and in order to permit the rearward removal of said bars and needles said fingers must be removed from their path, which can be done by raising the bar $t^8$ until the plate $t^9$ is disengaged from the notch in the upper end of the lever $t^7$, and then turning it a half-revolution in its bearings.

What I claim as new, and desire to secure by Letters Patent of the United States, is—

1. The rig-band guides S, provided with the L-shaped slot $s^8$ in its inner end, and the slot $s^4$, for the passage of the latch-needle, substantially as described.

2. The combination of the two heddle-needles I I, the bars O² and O⁶, and the plate O′, all firmly secured together, as set forth, with the stand U², provided with the set-screw $q$, the carriage O⁴, and the supporting-guides $o^5$ and $o^6$, all arranged and adapted to operate substantially as described.

3. The combination of the bars O² and O⁶ and the plate O′, firmly secured together, the pin $o′$, formed upon the forward end of the bar O², and the plate O³, provided with a hole to receive said pin, as shown, with the forked stand U², the set-screw $q$, the needles I I, and the guiding supports or shoes O⁵ and O⁷, all arranged and adapted to operate substantially as and for the purposes described.

4. The combination of the plate O′, the bar O², the carriage O⁴, secured thereto, the curved plate $o^3$, overhanging said bar, the needles I I, the bar O⁶, and the truck or roll $o^6$, all arranged and adapted to operate substantially as described.

5. The combination, with the heddle-needles I I, of the forked shoe O⁵, having the forward part of its upper surface curved downward, the bar O⁶, and the shoe O⁷, secured to the front end of said bar O⁶, and having the front portions of its upper and lower surfaces curved, respectively, downward and upward, substantially as and for the purposes described.

6. The combination of the spool-supporting spindle S⁵ with the ring-weight $s^5$, the pressure-rolls $p\ p$, the housings U′ U′, the springs $p′ p′$, the pendent rods $p^2 p^2$, and the yarn-guiding fork $s^7$, all arranged and adapted to operate substantially as and for the purposes described.

7. The combination, with a clutch operating or shipping mechanism, of the weighted lever Y, adapted to operate said mechanism in one direction, the catch-lever $t^2$, the wire $t^4$, the levers $t^5$, $t^6$, and $t^7$, and the gage-fingers $u^5 u^5$, all arranged and adapted to operate substantially as and for the purposes described.

8. The combination, with the gage-fingers $u^5 u^5$ and the vertical support $t^8$, for said fingers, set eccentric thereto, as set forth, of the lever $t^7$ and means of locking said gage-fingers in a fixed position, substantially as described.

9. The combination of the lever $t^7$, provided with the ears $u^3 u^3$ and a notch in its upper end, with the vertical bar $t^8$, provided with horizontally-projecting plate $t^9$, and the vertical gage-fingers $u^5 u^5$, all arranged and adapted to operate substantially as described.

In testimony whereof I have signed my name to this specification, in the presence of two subscribing witnesses, on this 23d day of April, A. D. 1883.

JOSEPH SLADDIN.

Witnesses:
N. C. LOMBARD,
FRED SLADDIN.